Sept. 1, 1936.   C. H. BIBB   2,052,742
PROCESS OF CONVERTING PINE OIL INTO USEFUL PRODUCTS
Filed Nov. 25, 1935
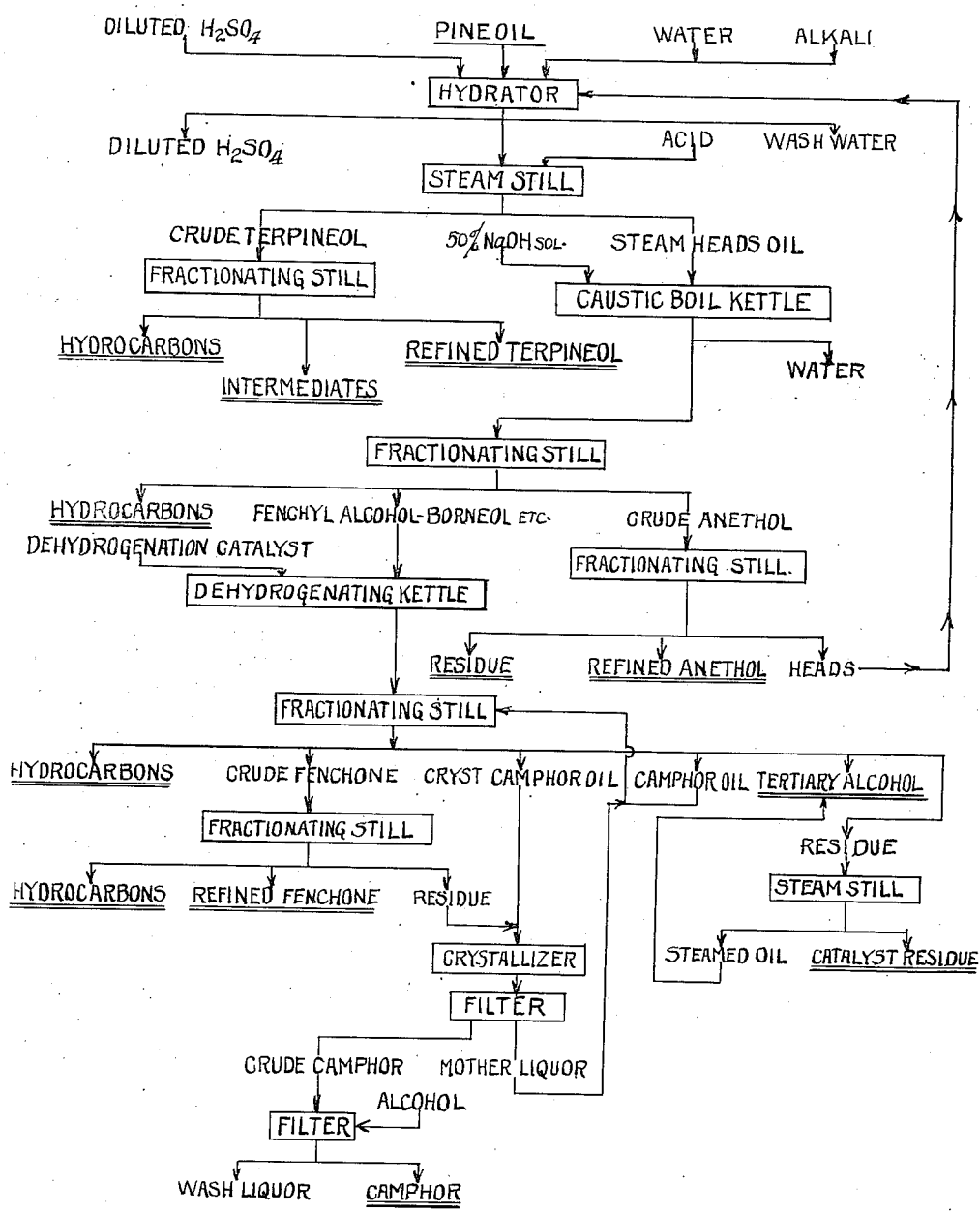

Patented Sept. 1, 1936

2,052,742

UNITED STATES PATENT OFFICE 2,052,742

PROCESS OF CONVERTING PINE OIL INTO USEFUL PRODUCTS

Carlisle H. Bibb, Pensacola, Fla., assignor to Newport Industries, Inc., Pensacola, Fla., a corporation of Delaware Application November 25, 1935, Serial No. 51,447

8 Claims. (Cl. 260—133)

This invention relates to a process of separating pine oil into commercially desirable constituents or derivatives of the oil.

More specifically, this invention relates to a process involving a series of chemical and physical manipulations of pine oil and various fractions thereof to separate out, in a relatively pure form, the components of the pine oil, either as such, or as commercially desirable derivatives.

It is well known that pine oil contains alpha terpineol as its major constituent, with minor amounts of borneol, fenchyl alcohol, methyl chavicol, various tertiary alcohols and unknowns, camphor, and hydrocarbons. According to this invention, the pine oil, or a fraction thereof, is treated so that certain components of the oil form derivatives and provide means for their separation from the oil, and at the same time will leave the remaining oil in a form which can be treated to separate the components thereof.

Processes heretofore used for separating the constituents of pine oil resulted in the formation of large amounts of hydrocarbons. These hydrocarbons have a limited commercial value, and are therefore undesirable.

It is therefore an object of this invention to convert and separate pine oil into commercially useful components or derivatives.

Another object of this invention is to provide a process for separating the components of pine oil which avoids the usual excessive formation of hydrocarbons.

Another object of this invention is to provide a process for separating pine oil into commercially desirable components or derivatives without the use of added solvents.

A further object of the invention is to provide a process of making pure products from pine oil without the necessity of purifying the intermediate or parent substances from which the products are formed.

Other and further objects of this invention will be apparent from the following description and annexed sheet of drawing.

On the drawing:

The drawing illustrates graphically the steps of the process of this invention in a flow sheet form.

As shown on the drawing:

Pine oil or any suitable fraction of pine oil is agitated in a hydrator with dilute sulphuric acid to form terpin hydrate. Suitable conditions for this reaction are fully disclosed in the literature. For example, if four parts of 25% sulphuric acid are agitated with one part of pine oil for twenty-four hours at 30° C., a nearly complete formation of terpin hydrate results from the terpineol in the pine oil. It should be apparent, however, that a stronger solution of sulphuric acid may be used at lower temperatures, and that other acids such as, for example, phosphoric acid, may be used in place of sulphuric acid. The ratio of acid solution to oil obviously may be varied widely, if due consideration is given to the time factor of the reaction.

The terpin hydrate exists as suspended crystals in the oil layer of the mixture in the hydrator. The diluted sulphuric acid is then drained off and the oil layer is washed in the hydrator with water. After the washing operation, additional amounts of water are added, and the mixture is made alkaline by adding any alkali, for example, sodium hydroxide, potassium hydroxide, sodium carbonate, and the like.

The alkaline mass in the hydrator is next removed to a steam still, wherein it is steam distilled to remove the oil from the terpin hydrate as a steamed heads oil fraction.

After the removal of the steamed heads oil, the terpin hydrate mixture in the steam still is made slightly acid by the incorporation of any suitable mineral acid, such as, for example, sulphuric acid, and the steam distillation is continued to remove a crude terpineol fraction from the steam still.

The crude terpineol is separated from the water of the distillate and refined by fractional distillation, for example, at 6 mm. mercury pressure to give hydrocarbons boiling up to 78° C.; an intermediate cut boiling between 78° and 90° C., and refined terpineol boiling from 90° to 95° C. at the pressure employed. As shown on the drawing, these fractions are underlined to indicate that they are final products in this process.

If desired, the crude terpineol fraction may be refined according to the process described in my copending application entitled "Process of distilling terpineol", Serial No. 52,808, filed December 4, 1935. According to that process, the crude terpineol is distilled in the presence of small amounts of caustic alkali.

Thus, by the first major step of my process, pine oil is divided approximately in half, one half part being refined terpineol and the other half part being steamed heads oil. The remaining part of the process deals with the treatment of the steamed heads oil which contains methyl chavicol, fenchyl alcohol, borneol, camphor, hydrocarbons, and tertiary alcohols such as dihydroterpineol.

The next step in the process relates to the isomerization of the methyl chavicol in the steamed heads oil to anethol by the catalytic influence of an alkali at elevated temperatures. The isomerization may be effected by introducing the steamed heads oil into a caustic boil kettle, together with 1% of a 50% caustic alkali solution, such as sodium hydroxide. If desired, the isomerization may be effected according to the process disclosed in my copending application entitled "Process of isomerizing methyl chavicol", Serial No. 52,809, filed December 4, 1935.

According to that process, the water in the steamed heads oil-caustic soda mixture is first driven out by boiling in the caustic boil kettle, so that the temperature of the oil will rise substantially above the boiling point of the water. Boiling is then continued for several hours more with the dry caustic soda in contact with the oil. Nearly complete conversion of the methyl chavicol to anethol will then result.

Anethol has the highest boiling point of any substance of consequence now in the caustic boil kettle, thereby making it possible to separate the other constituents from it by fractional distillation. The contents of the caustic boil kettle are therefore discharged into a fractionating still and preferably distilled under vacuum. For example, the charge in the fractionating still can be fractionated to remove two head fractions, one of which contains hydrocarbons boiling up to 64° C. at 10 mm. mercury pressure, and the other of which contains fenchyl alcohol, borneol, camphor, and tertiary alcohols boiling from 64° C. to 100° C. at 10 mm. mercury pressure. The anethol remains as a residue and may be fractionated by vacuum distillation. For example, the residue may be distilled in a separate fractionating still, as shown on the flow sheet, and a low boiling fraction distilling at 10 mm. mercury pressure is taken off until the temperature of the vapors going through the condenser of the fractionating still reach about 107° C. The main refined anethol is then distilled over and collected until the temperature reaches about 110° C. The heads boiling up to 107° C. may be recycled as shown on the flow sheet back to the pine oil hydrator, since they contain terpineol and borneol. If desired, the crude anethol may be refined according to my copending application entitled "Process of refining anethol", Serial No. 52,810 filed December 4, 1935. According to that process, the crude anethol is purified by repeated washings with an alkaline solution, followed by successive washings with water.

The heads oil fraction from the fractionating still boiling between 64° C. and 100° C. at 10 mm. mercury pressure, containing the borneol, fenchyl alcohol, camphor and tertiary alcohols, is now inserted in a dehydrogenating kettle and admixed with a dehydrogenating catalyst, so as to liberate the hydrogen from the alcoholic group of the secondary alcohols, fenchyl alcohol and borneol, to produce fenchone and camphor. This may be done by boiling the heads oil fraction with 5% of its weight of nickel carbonate, copper carbonate, or a mixture of both, for from six to eight hours. The metal carbonates change during the boiling operation to an active form of dehydrogenating catalyst. Hydrogen is allowed to escape from the dehydrogenating kettle by passing the vapors from the kettle through a condenser, whereby the oil carried by the hot hydrogen is condensed and returned to the kettle and thus separated from the hydrogen.

Part of the liberated hydrogen may be absorbed by the oil in hydrogenating some of the unsaturated compounds present. The extent of this absorption reaction depends upon the ratio of secondary alcohols to unsaturated compounds, and also upon the temperatures employed.

The heads oil fraction may be boiled with any of the following dehydrogenation catalysts: nickel carbonate, nickel formate, nickel hydroxide, copper carbonate, copper formate, copper hydroxide, finely divided nickel, finely divided copper, or any mixture of these catalysts. The boiling may be effected at temperatures between 175° C. and 220° C. without any other additions or special preparation to produce camphor and fenchone from the borneol and fenchyl alcohol present, with yields of 95% or more. Thus, this step in the process needs none of the special precautions disclosed in the prior art as being necessary to commercial practice for good yields and economy of processing raw materials. A relatively low temperature is used, the terpene alcohols are present in considerable amounts, and no consideration need be given to the alkalinity of the reacting mixture. No foreign solvents are used, and a large variety of cheap catalysts works very efficiently.

I have therefore found that the borneol and fenchyl alcohol in the heads oil fraction dehydrogenate more efficiently without the special precautions and peculiar conditions heretofore considered necessary in the prior art.

The entire charge from the dehydrogenating kettle is next introduced into a fractionating still and fractionated, for example, under a pressure of 10 mm. of mercury, so as to prevent any further action of the catalyst on the oil. The following fractions are removed:

1. Hydrocarbons_____Boiling up to 66° C.
2. Crude fenchone_ Boiling range 66° to 79° C.
3. Crystallizable camphor oil cut_____ Boiling range 79° to 86° C.
4. Camphor bearing oil _____ Boiling range 86° to 91° C.
5. Tertiary alcohol cut_____ Boiling range 91° to 95° C.
6. Spent catalyst residue The crude fenchone fraction boiling between 66° and 79° C. at 10 mm. mercury pressure can be refined by charging into a fractionating still and distilling at 10 mm. mercury pressure to remove a hydrocarbon fraction boiling up to 68° C. and a refined fenchone fraction boiling between 68° C. and 72° C. The residue contains camphor which is added to the No. 3 fraction listed above of the crystallizable camphor oil. This mixture is cooled and the camphor is crystallized and filtered therefrom, leaving a crude solid camphor and a mother liquor.

The crude solid camphor can be refined by washing in a filter with a small amount of ethyl alcohol to yield a wash liquor and pure camphor.

The mother liquor obtained after filtering the crude camphor is added to the No. 4 fraction, or the camphor bearing oil, and as shown in the flow sheet, may be returned to the next batch of dehydrogenated oil for another distillation to recover further quantities of camphor, camphor bearing oil, and tertiary alcohol, which find their way into these fractions because of the small differences in the boiling points of the components.

The No. 6 fraction, or the spent catalyst residue, is steam distilled, and the steamed oil thus obtained is added to the No. 5 fraction, or tertiary alcohol cut, since both are similar in composition.

Thus, by a related series of steps, pine oil is converted into the following commercially useful products:

1. Terpineol
2. Anethol
3. Fenchone
4. Camphor
5. Tertiary alcohols and unknowns
6. Hydrocarbons.

It should be understood that numerous modifications can be made of the above procedure without departing from the spirit and purpose of this invention. For example, the proportion of caustic soda used in the caustic boil kettle can be varied widely, together with the time of the boil. The amount and kind of dehydrogenating catalyst can be varied and still produce the desired results. The distillation of the various fractions can also be conducted at various pressures with equally good results.

It should be further understood that the term "pine oil" used in this specification and in the appended claims refers not only to the commercial product known to the trade as pine oil, but to any fraction of pine oil containing, in substantial proportions, any of the constituents of pine oil referred to in this specification.

The process of this invention, as is evident from the above description, consists of a procedure for converting and dividing pine oil into its various components and derivatives. The steps of the process comprise agitation of the pine oil with acid to form terpin hydrate, removal of the bulk of the acid from the mix, rendering the mixture alkaline, steam distilling the alkaline mixture to remove the steam heads oil adhering to the terpin hydrate, acidifying the terpin hydrate mixture and steam distilling to recover a crude terpineol fraction which can be fractionated to yield refined terpineol. The steam heads oil fraction is then treated with an alkali to form anethol, and the fenchyl alcohol, borneol, camphor and tertiary alcohols are fractionated from the anethol. These materials are then heated with a dehydrogenation catalyst to dehydrogenate the borneol and fenchyl alcohol and to hydrogenate unsaturated compounds. The hydrocarbons are then distilled off and fractions of fenchone, a crystallizable camphor bearing oil, a non-crystallizable camphor oil and a tertiary alcohol cut are removed. The camphor is crystallized from the crystallizable camphor bearing oil, and the mother liquor from the camphor oil is redistilled with the non-crystallizable camphor oil, so as to obtain more crystallizable camphor bearing oil, tertiary alcohols and unknowns.

I am aware that numerous details of the process may be varied through a wide range without departing from the principles of this invention, and I, therefore, do not purpose limiting the patent granted hereon otherwise than necessitated by the prior art.

I claim as my invention:

1. The process of converting and separating pine oil into its constituents and their derivatives, which comprises hydrating the pine oil to form terpin hydrate from the terpineols therein, separating the terpin hydrate from the oil, heating the oil with an alkali to isomerize the methyl chavicol therein to anethol, and then distilling the oil into a plurality of distillate fractions.

2. The process of converting and separating pine oil into its constituents and derivatives, which comprises reacting pine oil with a hydrating acid to form terpin hydrate crystals from the terpineols in the oil, separating the crystals from the oil, heating the oil with an alkali to isomerize the methyl chavicol therein into anethol, then distilling the oil into a plurality of distillate fractions, dehydrogenating one or more of said fractions containing fenchyl alcohols and borneol to produce fenchone, camphor oil and tertiary alcohols, and recovering refined fenchone and camphor from said fractions.

3. The process of converting and separating pine oil into its constituents and their derivatives, which comprises reacting the pine oil with dilute sulphuric acid to form terpin hydrate crystals in admixture with an oil solution, rendering said admixture alkaline, steam distilling the alkalinized mixture to remove the oil from the terpin hydrate, heating the previously separated oil distillate with caustic alkali to isomerize the methyl chavicol therein into anethol, fractionating the oil containing the anethol into a plurality of fractions to separate low boiling hydrocarbons therefrom and a fraction containing fenchyl alcohol, borneol, camphor and tertiary alcohols, reacting the fenchyl alcohol containing fraction with a dehydrogenation catalyst to produce camphor and fenchone from the borneol and fenchyl alcohol therein and recovering the camphor and fenchone.

4. The process of converting and separating pine oil into its constituents and their derivatives which comprises reacting the pine oil with dilute sulphuric acid to form a mixture of terpin hydrate crystals and oil, washing the so formed mixture with water, rendering the mixture alkaline, steam distilling the alkaline mixture to separate an oil fraction therefrom, reacting the separated oil with caustic soda at temperatures above 212° to isomerize the methyl chavicol therein into anethol, fractionally distilling the alkalinized oil into distillate fractions dehydrogenating the fenchyl alcohol and borneol containing fractions to produce fenchone and camphor and recovering refined camphor and refined fenchone from said dehydrogenated mixture.

5. The process of converting and separating pine oil into commercially desirable constituents and derivatives without the use of added solvents, which comprises agitating the pine oil with a hydrating acid to form terpin hydrate, removing the bulk of the acid, making the mixture alkaline, steam distilling the alkaline mixture to remove the steam heads oil adhering to the terpin hydrate, heating the steam heads oil with an alkali to form anethol, distilling off the fenchyl alcohol, borneol, camphor, and tertiary alcohols from the alkaline oil solution, heating said distilled off materials with a dehydrogenating catalyst to dehydrogenate the borneol and fenchyl alcohol and to hydrogenate unsaturated compounds therein, distilling off the hydrocarbons and fractionating out the fenchone, a crystallizable camphor bearing oil, a non-crystallizable camphor oil and a tertiary alcohol cut, and crystallizing out the camphor from the crystallizable camphor bearing oil.

6. The process of converting and separating pine oil into commercially desirable derivatives and constituents, which comprises agitating the pine oil with a dilute hydrating acid to form terpin hydrate, removing the bulk of the acid, rendering the mixture alkaline, steam distilling the alkaline mixture to remove a steam heads oil fraction, heating the steam heads oil fraction with an alkali to form anethol, distilling off a hydrocarbon fraction boiling up to 64° C. at 10 mm. mercury pressure therefrom, recovering a fenchyl alcohol and borneol fraction distilling at temperatures between 64° C. and 100° C. at 10 mm. pressure, dehydrogenating the fenchyl alcohol and borneol fractions to form camphor and fenchone and recovering the fenchone and camphor from the mass.

7. In the process of separating and converting pine oil into its constituents and derivatives, the step of dehydrogenating fenchyl alcohol and borneol, which comprises heating with a dehydrogenating catalyst a distilled portion of pine oil from which the terpineol and methyl chavicol have been substantially separated and containing the fenchyl alcohol and borneol present in the original pine oil.

8. In the process of separating and converting pine oil into its constituents and derivatives, the step of dehydrogenating fenchyl alcohol and borneol in the presence of tertiary alcohols and hydrogenating a part of the unsaturated compounds present, comprising boiling with a dehydrogenating catalyst the portion of pine oil containing, after separation of other constituents, the fenchyl alcohol and borneol present in the original oil.

CARLISLE H. BIBB.